INVENTORS
JOSEPH P. LICATA
Frederick T. Tucker
Donald P. Selweck
ATTORNEY

Patented June 10, 1969

3,449,559
HEADLAMP ACTUATOR
Joseph P. Licata, Dayton, Ohio, and Frederick T. Tucker, West Haven, Conn., assignors to General Motors Corporation, Detroit, Mich., a corporation of Delaware
Filed Mar. 9, 1966, Ser. No. 532,930
Int. Cl. B60q 1/02, 9/00
U.S. Cl. 240—7.1                                6 Claims

ABSTRACT OF THE DISCLOSURE

Actuating mechanism for moving a headlamp cover in opposite directions between closed and open positions. A control circuit operates a reversible motor to cause the cover to move from one position to another. A relay responsive to a stall load on the motor is operable to interrupt power to the motor when the cover reaches its closed and open positions.

---

This invention relates to actuating mechanisms and more particularly to a headlamp cover door actuator for a motor vehicle.

In certain present day motor vehicles, headlamp cover doors are provided to conceal the headlamp when the latter are not being used. These headlamp cover doors normally provide a face shield for the headlamps when the headlamps are not in use but are required to open automatically and completely when the lamp switch is operated to turn on the headlamps. Certain headlamp doors are electrically actuated by a reversible electric motor and an important consideration is a limiting of the travel of the actuator mechanism induced by the electric motor. The limiting can be accomplished by the use of ordinary microswitches but this has proved to be expensive and other means are more desirable.

It is an object of the present invention to provide an improved actuating mechanism for vehicle headlamp cover doors which automatically shuts off an electrical power source when full travel of the cover doors is achieved while either opening or closing.

It is another object of the present invention to provide an improved actuating mechanism for the operation of vehicle headlamp cover doors which goes into operation as soon as the headlamps are turned on and which automatically stops the electric motor from operating when the headlamp cover doors have acheived full travel.

It is yet another object of the present invention to provide an actuating mechanism of the type described in the previous objects which utilizes a capacitor fired SCR to start the headlamp cover door actuation and which utilizes motor stall current to shut off the power actuator.

Further objects and advantages of the present invention will be apparent from the following description, reference being had to the accompanying drawings wherein preferred embodiments of the present invention are clearly shown.

Figure 1:
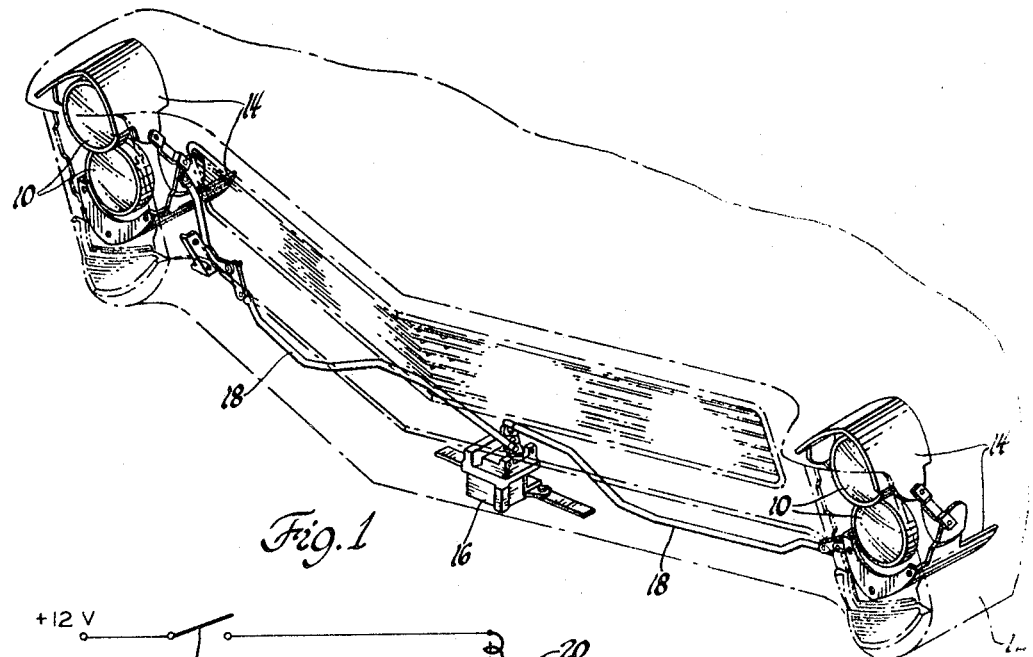
FIGURE 1 is a perspective view of a vehicle headlamp cover door actuating mechanism.

Referring to FIGURE 1, headlamps 10 are illustrated as being mounted in the fenders of a vehicle 12 with headlamp cover doors 14 arranged to move from the fully open position shown in FIGURE 1 to a fully closed position and vice versa. An electric motor 16 provides power through linkage 18 to close and open doors 14 as required. Motor 16 is typically a reversible D.C. motor powered by a vehicle battery and selectively energized by the vehicle headlamp switch, not shown, normally located in the driving compartment of the vehicle.

Figure 2:
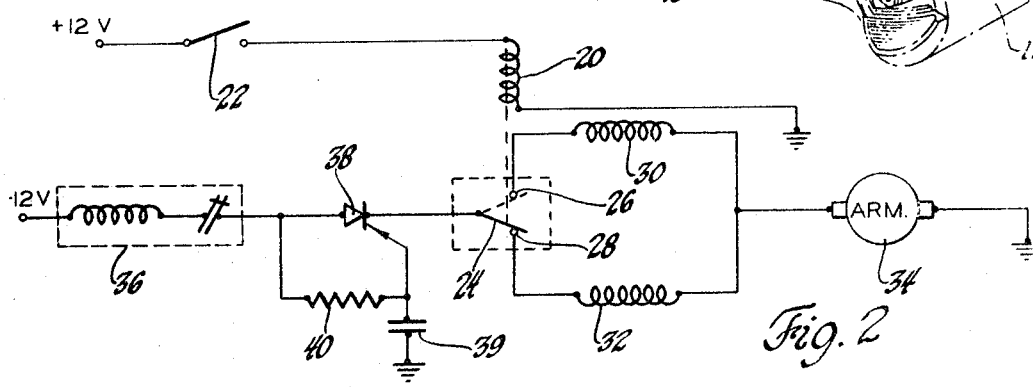
FIGURE 2 is a circuit diagram of an embodiment of a control means for operating the actuating mechanism of FIGURE 1.

Referring to the circuit diagram of FIGURE 2, a voltage source is selectively put into conductive relationship with coil 20 by means of switch 22. Switch 22 in a given installation could be the normal headlamp actuating switch. Coil 20 is arranged to move motor switch blade 24 between points 26 and 28, thereby connecting either field coil 30 or 32 to ground depending on the direction of rotation of armature 34 that is desired.

A 12-volt supply is also provided to current relay 36 electrically connected to SCR 38. SCR 38 completes a path for current flow between motor switch blade 24 and the 12-volt power supply in a manner to be hereinafter described. Capacitor 39 and resistor 40 are connected between ground and the 12-volt supply in a manner putting a predetermined bias on the gate of SCR 38.

It is assumed for purposes of this explanation that the headlamp cover doors 14 are in the normal closed position with the headlamp 10 being off. When it is desired to turn the headlamps on, switch 22 is closed energizing coil 20, as seen in FIGURE 2. Energization of coil 20 draws motor switch 24 from the dotted line position, shown in FIGURE 2, engaging point 26 to the solid line position engaging point 28. As the contact arm passes between points 26 and 28, capacitor 39 is charged through the current relay 36 from the 12-volt supply. The time necessary for charging capacitor 39 is determined by the RC time constant of the circuit which can be designed as required in a given installation.

When the contact blade of motor switch 24 comes into the solid line position, shown in FIGURE 2, wherein point 28 is engaged, capacitor 39 discharges to the gate of the SCR turning the SCR on. When the SCR fires, energy is provided at field coil 32 rotating armature 34 in the desired direction causing linkage 18, as seen in FIGURE 1, to bring headlamp cover doors 14 to the open position as seen in that FIGURE. When doors 14 reach the full open position, motor 16 stalls providing a high stall current at current relay 36. Current relay 36 opens breaking the circuit to the SCR causing it to shut off. After a predetermined delay, as determined by the reset time of relay 36, the relay 36 recloses, poising the circuit for further operation. A leak path is provided from the 12-volt supply to ground through the motor so that capacitor 39 cannot charge and the motor remains unenergized. It is therefore apparent that the capacitor 39 can only charge while the blade of motor switch 24 moves from one of the points 26 and 28 to the other and a reactuation or deenergization of coil 20 is required before another charge is built up in capacitor 39.

When it is desired to shut off the vehicle headlamps, doors 14 are closed in the following manner. Switch 22 which is a normally open switch is reopened and coil 20 deenergized allowing the contact blade of motor switch 24 to return to the dotted line position as seen in FIGURE 2. As travel in the switch blade occurs, capacitor 39 is again charged and immediately discharges through SCR 38 when contact is made with point 26. The SCR again fires providing a current flow through field coil 30 and a reverse rotation of motor 16, resulting in the headlamp cover doors 14 being driven to a closed position through linkage 18.

When the full closed position is reached again, motor 16 stalls causing a stall current to be sensed by current relay 36, opening the relay. The SCR again immediately shuts off and current relay 36 resets after a predetermined time period. The path for leak current through the resistor and the motor is available so that capacitor 39 will not recharge until the motor switch is recycled.

Figure 3:
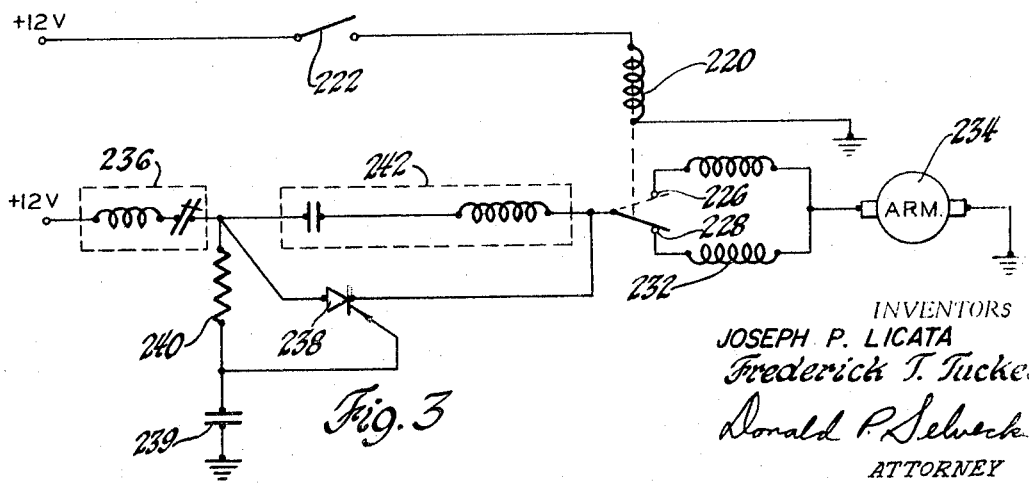
FIGURE 3 is another embodiment of a control means for operating the actuating mechanism of FIGURE 1.

Another embodiment of the subject invention is seen in FIGURE 3 wherein the same reference numerals will be applied to similar portions of the circuit, but prefixed with the numeral "2." The basic difference in this embodiment from the embodiment of FIGURE 2 is the addition of a current relay 242 in parallel with the SCR to increase the current carrying capabilities of the control. The function of the embodiment of FIGURE 3 is the same as that of FIGURE 2 with the difference that current relay 242 operates as soon as the SCR 238 fires, thereby shunting the SCR. The reason for this arrangement is that a typical electric motor used in this type installation might draw up to 30 amps and the cost of using an SCR capable of carrying 30 amps would be prohibitive. With the embodiment shown in FIGURE 3, the SCR 238 can have a relatively low current carrying capability with the high current being carried by relay 242.

The present invention finds particular utility in an installation such as a control mechanism for headlamp cover doors. The linkage can be arranged so that the cover doors operate between two extremes of movement limited by the linkage itself or exterior stops which results in the electric motor, driving the linkage, stalling when the extremes of potential movement are reached. The stall current very simply causes a current relay to operate, thereby interrupting current flow from a power source. The fact that the capacitor firing the SCR will charge only when the motor control switch is being moved internally allows a permanent circuit shutdown when the motor stall occurs and the power supply is isolated from the motor.

While the embodiments of the present invention, as herein disclosed, constitute preferred forms, it is to be understood that other forms might be adopted.

What is claimed is as follows:

1. An actuator mechanism comprising: a power source; power operable means selectively drivable by said power source; and control means selectively transmitting power from said power source to said power operable means and interrupting the power transmission when a predermined load on said power operable means is sensed, said control means including a silicon controlled rectifier responsive to a discharging capacitor to start said power operable means and current responsive means reacting to a stalled current to shut off said power operable means.

2. An actuating mechanism for moving a member in opposite directions between two positions and with the member engaging a stop when it reaches the position to which it is being moved comprising: an electrical power source; a reversible electric motor operatively connected with said member; and selectively operable control circuit means for energizing said motor to cause said member to be moved from one position toward its other position and being responsive to a predetermined stall load on the motor when said member is in its other position to de-energize said motor, said control circuit means including a first switch means movable between first and second positions for controlling the direction of rotation of said electric motor, a semiconductor device in series with said first switch means, a means for turning on said semiconductor device in response to said first switch means being moved between its positions to effect current tranmission from said power source to said motor upon said first switch means reaching the position to which it is being moved, and a current responsive means in series with said semiconductor device and being operable to interrupt the current flow to said motor upon sensing a predetermined stall load on the motor when said member reaches its other position.

3. An actuating mechanism as defined in claim 2 wherein said means for turning on said semiconductor device includes a capacitor which discharges to turn on said semiconductor device when said first switch means is being moved between its positions.

4. An actuating mechanism as defined in claim 2 wherein said control circuit means also includes a current responsive means in parallel with said semiconductor device and which is in series with the other current responsive means and first switch means.

5. An actuating mechanism as defined in claim 2 wherein said semiconductor device is an SCR and wherein the means for turning on the SCR includes a capacitor.

6. A headlamp cover door mechanism comprising: a source of D.C. electrical power; a reversible D.C. motor energized by said source of D.C. power; drive means including headlamp cover doors driven between two extremes of movement from full open to full closed by said D.C. motor; and a motor control circuit including a capacitor fired silicon controlled rectifier and a current relay responding to motor stall current for selectively starting and stopping said D.C. motor to operate the headlamp cover door drive means.

References Cited

UNITED STATES PATENTS

| | | | |
|---|---|---|---|
| 2,360,530 | 10/1944 | Voorhees et al. | 240—7.1 |
| 3,143,696 | 8/1964 | Harris | 318—266 |

NORTON ANSHER, *Primary Examiner.*

CHARLES E. SMITH, *Assistant Examiner.*

U.S. Cl. X.R.

317—33; 323—57